(12) United States Patent
Kay et al.

(10) Patent No.: US 12,122,902 B2
(45) Date of Patent: Oct. 22, 2024

(54) ADHESION OF POLYOLEFINS TO POLYESTERS

(71) Applicant: INTERFACE POLYMERS LIMITED, Loughborough (GB)

(72) Inventors: Christopher Kay, Loughborough (GB); Peter Scott, Loughborough (GB); Simon Waddington, Loughborough (GB); Shaun Morris, Loughborough (GB)

(73) Assignee: INTERFACE POLYMERS LIMITED, Loughborough (GB)

( * ) Notice: Subject to any disclaimer, the term of this patent is extended or adjusted under 35 U.S.C. 154(b) by 186 days.

(21) Appl. No.: 16/652,292

(22) PCT Filed: Oct. 1, 2018

(86) PCT No.: PCT/EP2018/076561
§ 371 (c)(1),
(2) Date: Mar. 30, 2020

(87) PCT Pub. No.: WO2019/063836
PCT Pub. Date: Apr. 4, 2019

(65) Prior Publication Data
US 2020/0239672 A1 Jul. 30, 2020

(30) Foreign Application Priority Data
Sep. 29, 2017 (GB) ...................... 1715831

(51) Int. Cl.
*C08L 23/06* (2006.01)
*B32B 27/08* (2006.01)
*B32B 27/10* (2006.01)
*B32B 27/18* (2006.01)
*B32B 27/30* (2006.01)
*B32B 27/32* (2006.01)
*B32B 27/36* (2006.01)
*B65D 65/40* (2006.01)
*C08F 293/00* (2006.01)
(Continued)

(52) U.S. Cl.
CPC .............. *C08L 23/06* (2013.01); *B32B 27/08* (2013.01); *B32B 27/10* (2013.01); *B32B 27/32* (2013.01); *B32B 27/36* (2013.01); *B65D 65/40* (2013.01); *C08F 293/005* (2013.01); *C08J 5/18* (2013.01); *B32B 27/18* (2013.01); *B32B 27/306* (2013.01); *B32B 27/308* (2013.01); *B32B 27/327* (2013.01); *B32B 2270/00* (2013.01); *B32B 2307/72* (2013.01); *B32B 2553/00* (2013.01); *C08F 297/083* (2013.01); *C08F 2438/00* (2013.01); *C08J 2323/06* (2013.01); *C08J 2367/02* (2013.01); *C08J 2453/00* (2013.01); *C08L 23/0815* (2013.01); *C08L 23/0853* (2013.01); *C08L 23/0869* (2013.01); *C08L 53/00* (2013.01); *C08L 67/02* (2013.01); *C08L 67/03* (2013.01); *C08L 2203/16* (2013.01); *Y10T 428/3179* (2015.04); *Y10T 428/31797* (2015.04)

(58) Field of Classification Search
None
See application file for complete search history.

(56) References Cited

U.S. PATENT DOCUMENTS 4,183,435 A * 1/1980 Thompson ............... B65D 1/34
428/317.1
4,432,820 A * 2/1984 Thompson .............. B32B 27/32
156/244.11
(Continued)

FOREIGN PATENT DOCUMENTS

CN 103540368 A 1/2014
CN 106544067 A 3/2017
(Continued)

OTHER PUBLICATIONS

Thermoplastics and Thermoplastic Composites (M. Biron) Elsevier, (p. 218-240, 413-426) 2007. (Year: 2007).*
(Continued)

*Primary Examiner* — Vivian Chen
(74) *Attorney, Agent, or Firm* — The Dobrusin Law Firm, P.C.

(57) ABSTRACT

The use of a block copolymer of the following structure. Wherein R and $R^1$ may be the same or different and each independently represents an alkyl or aryl group, X may be hydrogen or $C_1$ to $C_{20}$ alkyl group which may be branched or linear and wherein the aromatic ring substituent joined to polymer B is positioned meta or para to the aromatic ring substituent joined to polymer A and, wherein polymer A is a polymer (or copolymer) of ethylene and polymer B is a polymer of monomers selected from vinyl acetate, $C_1$-$C_9$ acrylate esters, acrylic acid and mixtures thereof as an additive in polyethylene or polyethylene terephthalate to improve the adhesion between co-extruded layers of the polyethylene and the polyethylene terephthalate and laminated films derived from such use.

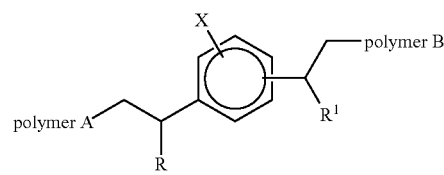

16 Claims, No Drawings

(51) Int. Cl.
  *C08F 297/08* (2006.01)
  *C08J 5/18* (2006.01)
  *C08L 23/08* (2006.01)
  *C08L 53/00* (2006.01)
  *C08L 67/02* (2006.01)
  *C08L 67/03* (2006.01)

(56) References Cited

U.S. PATENT DOCUMENTS

| | | | | |
|---|---|---|---|---|
| 4,698,246 | A * | 10/1987 | Gibbons | B32B 27/304 |
| | | | | 428/458 |
| 4,741,957 | A * | 5/1988 | Park | B32B 27/32 |
| | | | | 428/476.3 |
| 4,957,578 | A * | 9/1990 | Huffman | D21H 19/826 |
| | | | | 156/244.11 |
| 5,209,972 | A * | 5/1993 | Super | B65D 75/26 |
| | | | | 428/458 |
| 5,470,624 | A * | 11/1995 | Oreglia | B32B 27/304 |
| | | | | 428/36.1 |
| 6,258,423 | B1 * | 7/2001 | Giori | B32B 27/36 |
| | | | | 428/347 |
| 9,540,583 | B2 | 1/2017 | Waterson | C10M 145/02 |
| 9,670,383 | B2 | 6/2017 | Yamauchi et al. | |
| 9,845,375 | B2 * | 12/2017 | Waterson | C08F 295/00 |
| 10,100,140 | B2 * | 10/2018 | Scott | C08L 101/00 |
| 10,273,426 | B2 * | 4/2019 | Theaker | C10L 1/1973 |
| 2002/0127362 | A1 * | 9/2002 | Jansen | H01M 50/119 |
| | | | | 903/952 |
| 2004/0099565 | A1 * | 5/2004 | Dehlin | B65D 5/38 |
| | | | | 206/536 |
| 2005/0159549 | A1 * | 7/2005 | Kendig | B32B 27/08 |
| | | | | 525/119 |
| 2006/0247331 | A1 * | 11/2006 | Coffey | C08J 3/18 |
| | | | | 523/351 |
| 2009/0022863 | A1 * | 1/2009 | Lagerstedt | A23L 3/04 |
| | | | | 426/393 |
| 2013/0323446 | A1 * | 12/2013 | Yamauchi | C09J 7/21 |
| | | | | 428/335 |
| 2015/0011447 | A1 * | 1/2015 | Waterson | C09D 153/025 |
| | | | | 585/24 |
| 2017/0190995 | A1 | 7/2017 | Theaker et al. | |
| 2018/0066097 | A1 * | 3/2018 | Scott | C08F 297/048 |

FOREIGN PATENT DOCUMENTS

| | | | |
|---|---|---|---|
| EP | 3144330 | A1 | 3/2017 |
| GB | 1 444 163 | * | 7/1976 |
| JP | 10-305512 | A * | 11/1998 |
| JP | 2001342256 | A | 12/2001 |
| JP | 2015051632 | A | 3/2015 |
| JP | 2017125177 | A | 7/2017 |
| JP | 2018529011 | A | 10/2018 |
| TW | 200602421 | A | 1/2006 |
| WO | 2012108534 | A1 | 7/2014 |
| WO | 2017/046009 | A1 | 3/2017 |

OTHER PUBLICATIONS

International Search Report and Written Opinion, dated Apr. 1, 2019, Application No. PCT/EP2018/076561, filed Oct. 1, 2018.
GB Search Report, dated Apr. 11, 2018, Application No. GB1715831.2.
Brazilian Search Report and Written Opinion, BR Application No. 112020006385-1 dated Apr. 1, 2022.
Brazilian Response to Written Opinion, BR Application No. 112020006385-1 dated Oct. 10, 2022.
Chinese Office Action and Search Report, CN Application No. 201880069985, dated Jul. 20, 2022.
Chinese Second Office Action and Search Report, CN Application No. 201880069985, dated Dec. 21, 2022.
Chinese Second Office Action and Search Report, CN Application No. 201880069985, dated May 25, 2023.
European Office Action, EP Application No. 18785283.5, dated Feb. 23, 2021.
European Office Action, EP Application No. 18785283.5, dated Sep. 14, 2023.
Great Brittian Office Action, GB Application No. 1715831.2 dated Jan. 14, 2022.
Japanese Office Action, JP Application No. 2020-518456 dated Oct. 13, 2022.
Japanese Search Report, JP Application No. 2020-518456 dated Sep. 22, 2022.

* cited by examiner

ADHESION OF POLYOLEFINS TO POLYESTERS

FIELD

The present invention relates to novel block copolymers and their use in improving the adhesion between polyesters and polyolefins particularly between polyethylene and polyethylene terephthalate especially between co-extruded films of polyethylene and polyethylene terephthalate which may be used as packaging materials typically in combination with a paper layer to produce aseptic packaging.

BACKGROUND

The requirements of packaging materials are varied, they must perform as required on packaging lines, they must be robust and light weight to withstand storage, transportation and exhibition on shelves. Furthermore packages formed therefrom must have barrier properties such as to moisture and vapours, be printable and must also be readily opened to permit use of the packaged material. Plastic films, paper and card are materials frequently used for packaging and since certain films have particular properties (such as for example vapour barriers) they may not have other desirable properties (such as sealability). It is therefore commonplace to employ packaging materials comprising two or more layers of different materials in order to obtain the desired combination of properties. It is important that the different layers have good adhesion to each other to prevent the layers delaminating during use of the material.

A White Paper by I Hwa Lee, a Technical Fellow of Du Pont entitled "Bonding "Unjoinable" Polymers" indicates the difficulties encountered in the development of packaging materials.

In its FIG. 2 the White Paper indicates that polyethylene (LDPE and HDPE) and polyester have poor adhesion to each other. Polyethylene and polyethylene terephthalates otherwise have desirable properties and it has therefore been practice to employ a tie layers such as the Amplify TY Functional Polymers from Dow to bond the two materials together.

The different polymer layers used in packaging may be incompatible with each other meaning that the packaging material cannot be recycled or requires special recycling techniques. Any reduction in the number of layers in the packaging material may facilitate recycling and we have also found that this invention enables laminates of polyethylene terephthalate and polyethylene which previously could not be recycled to be recycled.

In PCT Application Publication WO 2017/046009 we describe two segmented block copolymers of the general structure.

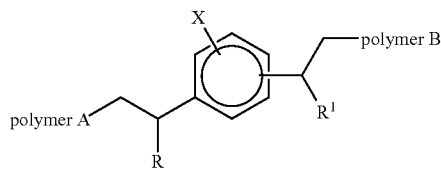

Wherein R and $R^1$ may be the same or different and each independently represents an alkyl or aryl group, X may be hydrogen or $C_1$ to $C_{20}$ alkyl group which may be branched or linear and wherein the aromatic ring substituent joined to polymer B is positioned meta or para to the aromatic ring substituent joined to polymer A and, wherein polymer A is a non-polar polymer (or copolymer) formed by metallocene catalysis and polymer B is a polymer formed by radical catalysis of a polar monomer (optionally with a non-polar polymer to form a copolymer segment).

These materials are said to be useful as additives to polymer systems particularly mixtures of polymers where they will improve the compatibility of the polymers and/or contribute a particular surface effect to the polymer such as providing a printable or paintable surface to a polyolefin material which may be useful for packaging films.

Polyethylene films are known to have excellent moisture barrier properties which makes them particularly useful in the packaging of foods and beverages. However, polyethylene films are poor in gas barrier properties. It is therefore known to laminate the polyethylene film to a polyester film such as polyethylene terephthalate film which provides gas barrier properties to the laminated film. However, polyethylene film and polyester film do not bond well together in co-extrusion processes and it has been necessary to produce the films separately and include an adhesive or PET tie layers such as Amplify TY4351 and 4751 from Dow Chemicals between the two films to ensure that they bond to each other with sufficient strength to enable their use particularly as packaging materials. Typical adhesives comprise graft copolymers in which polar monomers such as acrylic acid or maleic anhydride are grafted onto a polymeric backbone. Accordingly the materials are three layer materials which cannot be produced by co-extrusion of the polyethylene film and the polyester film. Co-extrusion being a technique in which two or more materials are simultaneously extruded and brought into contact with each other where they bond together by means of their adhesive properties in the melt.

U.S. Pat. No. 9,670,383 discloses a three layer laminate of a paper substrate/polyethylene/polyethylene terephthalate made by a process in which polyethylene terephthalate is directly coated onto a polyethylene surface that has been pre-coated on the paper. No adhesive layer is interposed between the polyethylene and polyethylene terephthalate layers. The process however requires the use of specific melt processing conditions including extruding the polyethylene terephthalate onto a polyethylene surface that has already been formed on the paper film so the two polymers are not co-extruded. Additionally the surface of the polyethylene film is treated by, for example, corona discharge to improve the adhesive properties of the surface. Furthermore, special equipment is required.

Many plastic laminates particularly laminar films are produced by co-extrusion where the layers of material are extruded and brought together in the melt where they bond together due to their adhesive properties in the melt. This is an economic and efficient process however it has not hitherto been possible to obtain a strong enough bond between polyethylene and polyethylene terephthalate by melt extrusion. We have now found that if a particular block copolymer is added to one or more of these materials improved adhesion between co-extruded layers of polyethylene and polyethylene terephthalate can be achieved. The laminar film obtained may be used to provide the desired properties in multilayer materials without the need for a tie layer between the polyethylene layer and the polyethylene terephthalate layer.

SUMMARY

The present invention therefore provides a block copolymer of the following structure.

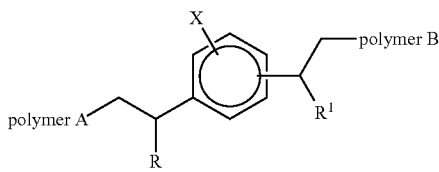

Wherein R and R¹ may be the same or different and each independently represents an alkyl or aryl group, X may be hydrogen or $C_1$ to $C_{20}$ alkyl group which may be branched or linear and wherein the aromatic ring substituent joined to polymer B is positioned meta or para to the aromatic ring substituent joined to polymer A and, wherein polymer A is a polymer (or copolymer) of ethylene and polymer B is a polymer of vinyl acetate.

The invention further provides the use of a block copolymer of the following structure.

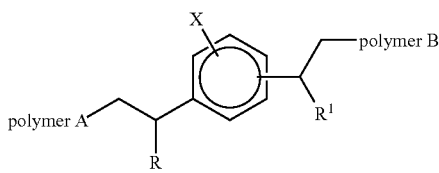

Wherein R and R¹ may be the same or different and each independently represents an alkyl or aryl group, X may be hydrogen or $C_1$ to $C_{20}$ alkyl group which may be branched or linear and wherein the aromatic ring substituent joined to polymer B is positioned meta or para to the aromatic ring substituent joined to polymer A and, wherein polymer A is a polymer (or copolymer) of ethylene and polymer B is a polymer of monomers selected from vinyl acetate, $C_1$-$C_9$ acrylate esters and acrylic acid and mixtures thereof as an additive in polyethylene or polyethylene terephthalate to improve the adhesion between layers of the polyethylene and the polyethylene terephthalate the layers are preferably co-extruded.

The block copolymer can be included in the polyethylene layer, the polyethylene terephthalate layer or both.

In another embodiment the invention provides polyethylene containing from 0.1 wt % to 15 wt % of a block copolymer of the following structure.

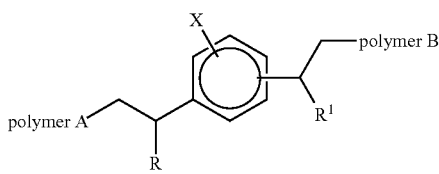

Wherein R and R¹ may be the same or different and each independently represents an alkyl or aryl group, X may be hydrogen or $C_1$ to $C_{20}$ alkyl group which may be branched or linear and wherein the aromatic ring substituent joined to polymer B is positioned meta or para to the aromatic ring substituent joined to polymer A and, wherein polymer A is a polymer (or copolymer) of ethylene and polymer B is a polymer of monomers selected from vinyl acetate, $C_1$-$C_9$ acrylate esters and acrylic acid and mixtures thereof.

In another embodiment the invention provides polyethylene terephthalate containing from 0.1 wt % to 15 wt % of a block copolymer of the following structure.

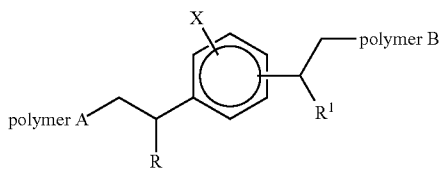

Wherein R and R¹ may be the same or different and each independently represents an alkyl or aryl group, X may be hydrogen or $C_1$ to $C_{20}$ alkyl group which may be branched or linear and wherein the aromatic ring substituent joined to polymer B is positioned meta or para to the aromatic ring substituent joined to polymer A and, wherein polymer A is a polymer (or copolymer) of ethylene and polymer B is a polymer of a monomer selected from vinyl acetate, $C_1$-$C_9$ acrylate esters and acrylic acid and mixtures thereof.

The block copolymer may be provided to a formulator as a masterbatch of the block copolymer in polyethylene or in polyethylene terephthalate. For example a masterbatch may contain from 30% to 70% of the block copolymer preferred masterbatches contain from 40% to 60% of the block copolymer which can be provided to a formulator or film maker for incorporation in the bulk polymer. The invention also includes such masterbatches which may be provided as pellets.

In a further embodiment the invention provides a laminate comprising a layer of polyethylene bonded to a layer of polyethylene terephthalate wherein at least one layer contains a block copolymer of the following structure.

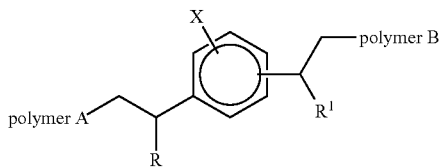

Wherein R and R¹ may be the same or different and each independently represents an alkyl or aryl group, X may be hydrogen or $C_1$ to $C_{20}$ alkyl group which may be branched or linear and wherein the aromatic ring substituent joined to polymer B is positioned meta or para to the aromatic ring substituent joined to polymer A and, wherein polymer A is a polymer (or copolymer) of ethylene and polymer B is a polymer of a monomer selected from vinyl acetate, $C_1$-$C_9$ acrylate esters and acrylic acid and mixtures thereof.

In a further embodiment the invention provides a laminate comprising a layer of paper bonded to a layer of polyethylene bonded to a layer of polyethylene terephthalate wherein at least one layer of the layer of polyethylene and the layer of polyethylene terephthalate contains a block copolymer of the following structure.

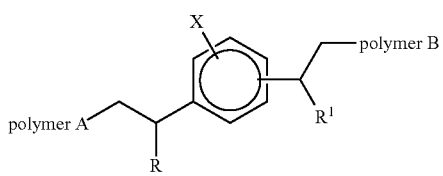

Wherein R and R¹ may be the same or different and each independently represents an alkyl or aryl group, X may be hydrogen or $C_1$ to $C_{20}$ alkyl group which may be branched or linear and wherein the aromatic ring substituent joined to polymer B is positioned meta or para to the aromatic ring substituent joined to polymer A and, wherein polymer A is a polymer (or copolymer) of ethylene and polymer B is a polymer of a monomer selected from vinyl acetate, $C_1$-$C_9$ acrylate esters and acrylic acid and mixtures thereof.

The invention also provides the use of such a laminate as a packaging material, particularly aseptic packaging for foods and beverages.

In a further embodiment the invention provides a process for the production of a laminate of polyethylene and polyethylene terephthalate comprising co-extruding layers of polyethylene and polyethylene terephthalate wherein at least one of the layers contains a block copolymer of the structure

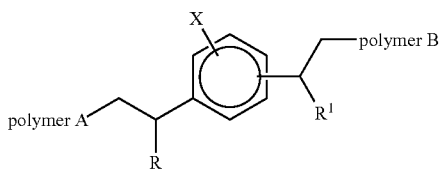

Wherein R and $R^1$ may be the same or different and each independently represents an alkyl or aryl group, X may be hydrogen or $C_1$ to $C_{20}$ alkyl group which may be branched or linear and wherein the aromatic ring substituent joined to polymer B is positioned meta or para to the aromatic ring substituent joined to polymer A and, wherein polymer A is a polymer (or copolymer) of ethylene and polymer B is a polymer of monomers selected from vinyl acetate, $C_1$-$C_9$ acrylate esters and acrylic acid and mixtures thereof.

Preferably, each R and $R^1$ group independently represents an alkyl group having from 1 to 4 carbon atoms. More preferably, R and $R^1$ are the same and most preferably are both methyl.

Preferably, the aromatic ring substituent joined to polymer B is positioned meta to the aromatic ring substituent joined to polymer A.

DETAILED DESCRIPTION

The block copolymer of this invention may be prepared by a) in a first step, polymerising ethylene, and optionally one or more 1-alkene co-monomers higher than ethylene such as $C_2$ to $C_8$ olefines particularly hexene and octene, preferably in the presence of a metallocene catalyst system to form polymer A, being a chain consisting of ethylenic structural units optionally bearing pendent alkyl groups originating from the 1-alkene comonomer(s), the reaction being carried out in the presence of a compound of the formula (I):

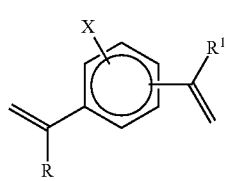

in a reaction vessel wherein, in the course of the reaction, the compound (I) is terminally incorporated onto polymer A resulting in the formation of a terminally unsaturated intermediate of the formula (II):

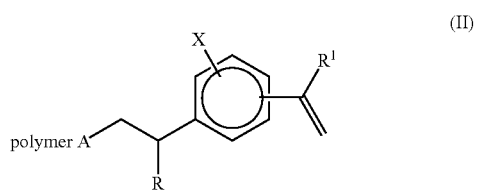

b) in an optional second step, recovering the intermediate (II) from the reaction mixture of the first step; and c) in a third step, reacting the intermediate (II) at its terminal double bond with a monomer selected from vinyl acetate, $C_1$-$C_9$ acrylate esters and acrylic acid and mixtures thereof in a subsequent radical polymerisation reaction to form polymer B.

where R, R1 and X are as previously defined.

Optionally step a) may be performed under hydrogen pressure in order to control the characteristics of polymer A.

In this specification, the word "terminal" when used in relation to a polymer chain (or block) simply refers to the end of the polymer chain (or block), and does not convey any additional mechanistic requirement that the chain (or block) end in question be the end at which the polymerisation reaction terminated. References to "terminally" shall be construed analogously.

Polymer A may have a backbone chain of polyethylenic structural units optionally incorporating in the backbone chain, units derived from 1-alkenes higher than ethylene, such that the resulting polymer chain remains an uninterrupted sequence of saturated aliphatic carbon atoms, the residual alkyl groups of the 1-alkene residues being borne as saturated alkyl substituents pendant from the polymer chain.

It is important that polymer A be terminally joined to polymer B, so as to leave polymer A exposed for interacting with the polyethylene or polyethylene terephthalate with which it is used. As such, it is important that the linkage between polymer A and polymer B be positioned at the end of the polymeric chain of polymer A.

To achieve this terminal positioning of the linkage between polymer A and polymer B, the process by which the copolymer is made should be specific for terminal functionalization of polymer A. Equally, it is important that the terminal functionalization formed on polymer A be sufficiently reactive to enable the subsequent formation of polymer B under radical polymerisation conditions that are industrially practical, whilst at the same time not being so highly reactive that unwanted side reactions occur to a significant extent.

The block A of the block copolymers of this invention is preferably produced by the metallocene catalysed polymerisation of ethylene optionally together with other alkene-1 compounds and the structure and molecular weight of block A can be tailored according to the nature of the polyethylene and the polyethylene terephthalate. We prefer however that it be substantially linear and have a number average molecular weight (Mn) in the range 1000 to 10,000. Such polymers preferably have a molecular weight distribution Mw/Mn from about 1 to about 3 preferably about 2.

The block B of the block copolymer is preferably produced by the free radical polymerisation. It is preferred that block B has a molecular weight (Mn) in the range of 1000 to 20,000 preferably in the range 3000 to 6000. Such polymers preferably have a molecular weight distribution (Mw/Mn) in the range 1.5 to 3.5 more preferably 2 to 3.

Block B may be prepared by the polymerisation of vinyl acetate or one or more $C_1$-$C_9$ acrylate esters or acrylic acid or mixtures thereof. Methyl acrylate, butyl acrylate and hexyl acrylate being preferred.

The heat sealable laminate of polyethylene and polyethylene terephthalate of the present invention can be formed without the use of an anchor coating agent or an adhesive. Thus, the laminate can be free from an odor problem due to a residual solvent or the like. Thus, a possible problem ascribed to a heat seal layer of polyolefin, such as adsorption of an olefin odor and fragrance components, is avoided, and excellent aroma retaining properties are ensured. Moreover, the polyethylene terephthalate layer has heat sealability.

The laminate of the present invention is also excellent in water vapor barrier properties and gas barrier properties. Moreover, the polyethylene terephthalate layer has heat sealability. Thus, the laminate can be formed into a container or the like by heat sealing, and the resulting container or the like is excellent in the long-term storage characteristics required of a food or beverage packaging material.

In one embodiment the laminate may comprise a layer of polyethylene provided on both surfaces with a layer of polyethylene terephthalate. In this embodiment either the polyethylene can contain the block copolymer used in the invention or both layers of polyethylene terephthalate may contain the block copolymer. Such a laminate is particularly useful for lamination to paper to produce packaging materials where one of the layers of polyethylene terephthalate can secure the adhesion of the laminate to the paper and the other layer provides a heat sealable surface for the ultimate closing of the packaging material. Thus, paper/polyethylene/polyethylene terephthalate can be laminated without the use of an anchor coating agent or an adhesive between the polyethylene and the polyethylene terephthalate.

In another embodiment of the present invention, polyethylene may be coated on at least one surface of a paper substrate, and polyethylene terephthalate containing the block copolymer is coated on the polyethylene surface by melt extrusion lamination, and again a strong laminate may be produced without an adhesive or the like being interposed.

The polyethylene terephthalate used in this invention (may hereinafter be referred to as "PET") consists essentially of a polyester which is formed by dehydration condensation of ethylene glycol as a diol component and terephthalic acid as a dicarboxylic acid component, and which has ester bonds connected together.

The polyethylene terephthalate for use in the present invention may be homopolyethylene terephthalate or a copolymer formed from a mixture of phthalic acids. Homopolyethylene terephthalate is formed by polycondensation of ethylene glycol as a diol component and terephthalic acid as a dicarboxylic acid component, and which does not positively contain any other copolymerization component. The polyethylene terephthalate may include impurity components which occur as by-products during preparation of polyethylene terephthalate.

It is preferred that the inherent viscosity (IV) of the polyethylene terephthalate used in the laminate of the present invention be in the range of 0.72 to 0.88 dL/g, particularly 0.80 to 0.83 dL/g. If the inherent viscosity is lower than this range, the film-forming properties can be poor and the inherent viscosity is higher than this range, it may be difficult to extrude.

The polyethylene terephthalate used in the present invention can incorporate compounding agents for film such as anti-blocking agents, antistatic agents, lubricants, antioxidants, and ultraviolet absorbers.

The polyethylene used in this invention may be any commercial polyethylene such as high-density polyethylene (HDPE), medium-density polyethylene (MDPE), low-density polyethylene (LDPE), and linear low-density polyethylene (LLDPE). The use of medium-density polyethylene, low-density polyethylene or linear low density polyethylene is preferred, particularly when the laminate is to be further bonded to paper because of their easy lamination onto a paper substrate.

The thickness of the polyethylene layer is not limited, but generally, a thickness of 10 to 60 μm is preferred.

The laminate of the present invention includes a polyethylene terephthalate surface which has heat sealability. Thus, it is possible to form the laminate into a predetermined shape by heat sealing polyethylene terephthalate surfaces to each other, without adding a further polyethylene layer. Furthermore it is possible to bond the polyethylene terephthalate to other substrates such as paper. Many packaging materials contain a layer of aluminum foil to provide barrier properties. It is believed that the present invention may enable polyethylene terephthalate to be used in place of aluminum to obtain the desirable barrier properties which also improves the recyclability of the packaging material.

Where a paper substrate is included any traditional paper substrates may be used in the laminate, paperboards conventionally used in paper containers can all be used. For example, ivory board, cup stock base paper, Manila board, cardboard, and synthetic paper can be used. The basis weight of the base paper or board used is not limited, but preferably, it is in the range of 180 to 500 g/m². If the basis weight is less than this range, the mechanical strength of the resulting container may be inferior to that obtained using paper within this range. If the basis weight is greater than this range, on the other hand, the resulting container can become so heavy that its handle ability and formability may be inferior.

The laminate of the present invention is not limited to two or three polyethylene/polyethylene terephthalate layers or to the three layers, paper/polyethylene/polyethylene terephthalate. For example, polyethylene also may be coated on the other surface of the paper. The selection of additional layers that should be added can be selected optionally depending on uses.

The present invention is illustrated by reference to the following Examples.

Example 1

Materials Used

Polyethylene Terephthalate Ramapet 180 a copolymer of terephthalic acid, isophthalic acid and mono-ethylene glycol obtainable from Informa Venturer having an Intrinsic viscosity of 0.80±0.02, density (D 1505) 1.4 g/cm³ Crystalline Peak melting point (D 3418) 245±5° C., Glass Transition temperature (D 3418) 78±2° C. (referred to as PET).

Low density polyethylene LDPC 3020K available from Lyondell Basell having a Melt Flow Rate (190° C./2.16 Kg) of 4 g/10 minutes a density of 0.928 g/cm³, vicat softening point (A/50N) of 97° C. a DSC melting point of 114° C. (referred to as LDPE).

Experimental Block Copolymers (of the invention) known as BCX26 and Polarfin PRP027 which is a polyethylene-block-poly(vinyl acetate), PE-b-PVAc, block copolymer consisting of a polyethylene block of number average molecular weight ($M_n$) 3200 and dispersity 2 as measured by high temperature gel permeation chromatography, terminally coupled to a polyvinyl acetate) (PVAc) block of approximately 20 monomer units (1700 $M_n$) as measured by solution phase Nuclear Magnetic Resonance (NMR) spectroscopy.

The polyethylene used to produce BCX26 was produced in a 1 gallon reactor in a semi-batch fashion by feeding ethylene as required to maintain a constant reactor pressure. A catalyst (Dicyclopentadienyl Zirconium dichloride Cp2ZrCL2 in toluene) was pumped in as needed to maintain the ethylene uptake near 100% of the 10 slpm setting of the ethylene flow meter. The reactor temperature was controlled manually to be near 90 C. A constant feed rate of 0.4 slpm of hydrogen was held throughout the test. Liquid samples (50-100 grams) were collected periodically throughout the test at 20, 40, 60, 90 120, and 150 minutes. Gas samples (1 liter) were collected two minutes before each liquid sample.

The polyethylene was used to make the PE-b-PVAc block copolymer as follows, the PE was catalytically reacted with Diisopropenyl benzene to produce PE-DIB. The PE-DIB (X g) was added to a 1 L reactor, along with X mL of toluene. Overhead stirrer turned on and set to 500 rpm.

Vinyl acetate (VAc) monomer (X mL) was added to the dropping funnel.

Reactor and dropping funnel purged with $N_2$ for 30 mins.

In separate round bottom flasks, VAc monomer (X mL) and Benzoyl peroxide (BP) stock solution (X g BP in X mL Toluene) were purged with $N_2$ for 30 mins.

Whilst the system was purging the reactor was heated to 110° C.

After purging, the VAc was transferred to the PE-DIBitoluene solution in the reactor, using a degassed syringe. This caused the internal temperature to drop to 94° C.

X mL of the BP solution was added to a degassed 50 mL syringe and placed on a syringe pump.

Addition from the syringe pump and dropping funnel was started at the same time. Feed Rates: VAc=X mL/hr, BP=X mL/hr.

The two solutions were added to the reactor over 2 hr and once completed the reaction was heated at 110° C. for a further 1 hr.

Volatiles were removed using a rotary evaporator leaving approximately 200 mL of slurry which was heated to 100° C. and precipitated into 2 L of stirred ethanol. The precipitate was left to settle, excess solvent decanted off and filtration used to yield the PE-b-PVAc block copolymer. The solid was collected from the filter and dried overnight in a vacuum oven to remove any residual solvent.

The material of the invention was compounded with the LDPE in an extruder at about 180° C. The material was then extruded from a three layer blown film die from an extruder consisting of three temperature zones. (Test 2). The material was compared with a similar material without the material of the invention (Test 1).

The inner layer was the compounded LDPE layer and the middle and outer layers were of the PET.

The layers were as follows.

| Test Number | Inner Layer | Middle Layer | Outer Layer |
|---|---|---|---|
| 1 | LDPE | PET | PET |
| 2 | LDPE + 10% BCX | PET | PET |

The extrusion conditions were

|  | Inner Layer (°) | Middle Layer (° C.) | Outer Layer (° C.) |
|---|---|---|---|
| Feeding Zone | 40 | Not Controlled | 65 |
| Zone 2 | 160 | 240 | 230 |
| Zone 3 | 190 | 270 | 270 |
| Zone 4 | 190 | 270 | 270 |
| Adapter | 190 | 270 | 270 |
| Die Zone 1 |  |  | 250 |
| Die Zone 2 |  |  | 250 |
| Screw Speed (RPM) | 40 | 20 | 20 |

The Haul Off Speed (m/min) was 6.5.

| Test Number | Inner Layer (Bar) | Middle Layer (Bar) | Outer Layer (Bar) |
|---|---|---|---|
| 1 | 80 | 46 | 46 |
| 2 | 52 | 37 | 45 |

The Interlayer adhesion was determined by assessing the force required to peel the LDPE inner layer away from the PET middle layer.

30 mm wide strips of the films were cut to form test pieces for the assessment of adhesion employing a peel test.

The films were opened 'at the bubble' to produce single layers of the film. The delamination at the PET/LDPE interface was started manually prior to testing, in order to provide parts of the sample to go into the grips. This delamination involved immersing the end of each of the test strips into water heated to 85° C. and the end 3-4 cm was immersed for a few minutes, removed, stressed in two directions within the plane of the film and re-immersed.

The Peel test results were as follows.

|  | TEST 1 | TEST 2 |
|---|---|---|
| Force (N) | 0.06 | 1.2 |
|  | 0.04 | 1.3 |
|  | 0.04 | 1.4 |
|  | 0.04 | 1.7 |
|  | 0.03 | 1.3 |
|  | 0.04 | 1.2 |
|  | 0.06 | 1.2 |
|  |  | 1.5 |
|  |  | 1.2 |
|  |  | 1.2 |
| Average (N) | 0.04 | 1.32 |

The areas over which steady state peeling took place were noted and used as the results. These areas are the parts of the test when the delamination is steady and the film is not curling around or folded back on itself.

In Test 2, the force required for peeling was sufficiently large to cause plastic deformation in the LDPE layer during the peel test as shown by stress whitening in the LDPE layer.

Example 2

40 g of the polyethylene diisopropyl benzene reactant prepared as in Example 1 of number average molecular weight by NMR of 1650 was fed into a reactor, fitted with a water condenser and nitrogen bubbler, with 300 ml toluene. The reactor was heated up to 100° C., and purged with $N_2$ for 30 minutes. 5.76 g of V601 initiator (0.0250 mol, 2 eq.) was dissolved in 50 ml toluene purged for 30 minutes. 170 ml of Methyl Acrylate (density=0.956 g/ml, 1.89 mol, 150 eq.) was also purged for 30 minutes. The initiator solution and the monomer solution were transferred to syringes set to 50 ml/hour and 170 ml/hour delivery respectively. The reactor was left under nitrogen atmosphere and the syringe pumps started, leaving the reaction for 1 hour. After 1 hour the reflux divider tap was opened and the temperature was increased to boil off toluene and unreacted monomer. After an hour, a toluene/polymer mixture (275 ml total volume) was emptied from the reactor. The polymer was then precipitated into 1.25 litres of methanol (a antisolvent ratio of 4.5:1). The sample was left to settle overnight. The top clear layer of methanol was decanted, 750 ml fresh methanol was added, stirred for 1 hour, and left overnight to settle. The top layer of methanol was decanted, and the product was transferred to a 1 litre rotary evaporator and evaporated to dryness. The product was then dried in a vacuum oven overnight and analysed and found to have a molecular weight of 5750 by NMR.

The product was compounded with linear low density polyethylene at 1%, 5% and 10% of the block copolymer and blown into film on a Haake film line. The film blowing parameters were as follows:

Screw speed 30 rpm
Haul off 300 units
Air blow time 1 minute
Air blow quantity 1 L/min The films were rolled up such that the first part of the extrudate was in the middle of the roll, and the last part at the outermost part of the roll.

Using a small white press the film samples were adhered to sheets of the polyester film Melinex. The film samples were preheated in hot plates for 20 seconds, after which the pressure was applied, at 10 Tonnes for 2 min 20 seconds. Several samples of film bonded to Melinex were produced for each batch.

The compression moulded samples were cut to strips of 40 mm wide. The delamination between the two components was manually started, and these two parts were fed into the grips of the tensile testing equipment, a Lloyds LR50k, fitted with a 50N load cell.

Peel testing was carried out at 100 mm/minute. The results for these samples are given in Table 3.

TABLE 3

Results of Peel Test of LLDPE Block Copolymer blend on Melinex polyester film

| Sample | Peel test (N/40 mm) | | | |
|---|---|---|---|---|
| | LLDPE | LLDPE + 1% Block Copolymer | LLDPE + 5% Block Copolymer | LLDPE + 10% Block Copolymer |
| 1 | 0.4 | 1.5 | 4 | 6.5* |
| 2 | 0.6 | 2.0 | 4 | 6.5* |
| 3 | 0.4 | 1.8 | 5 | 7* |
| 4 | 0.45 | 2.0 | 5 | 7* |
| 5 | 0.45 | 1.8 | 5 | |
| 6 | 0.5 | 1.8 | 5 | |
| 7 | | | 5 | |
| Average | 0.5 | 1.8 | 4.7 | 6.8* |

*The film samples containing 10% Block Copolymer stretched during testing. This indicates that the adhesion to the Melinex was greater that the tensile strength of the film. The peel strength of the film is therefore greater than the measured 7 N/40 mm.

The invention claimed is:

1. A co-extruded laminate comprising a layer of polyethylene bonded to a layer of polyethylene terephthalate, wherein the layer of polyethylene and the layer of polyethylene terephthalate each contain from 0.1 wt % to 15 wt % of a block copolymer of the following structure:

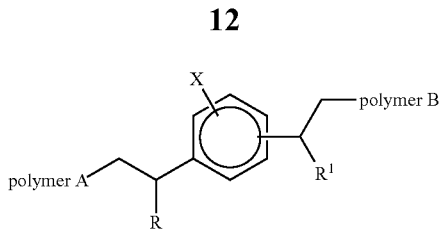

wherein R and $R^1$ are the same or different and each independently represents an alkyl or aryl group, and X is hydrogen or a $C_1$ to $C_{20}$ alkyl group which is branched or linear; wherein the aromatic ring substituent joined to polymer B is positioned meta or para to the aromatic ring substituent joined to polymer A; and wherein polymer A is a polymer (or copolymer) of ethylene and polymer B is a polymer of monomers selected from vinyl acetate, $C_1$-$C_9$ acrylate esters, acrylic acid, and mixtures thereof.

2. The co-extruded laminate according to claim 1, wherein each R and $R^1$ group independently represents an alkyl group having from 1 to 4 carbon atoms.

3. Packaging material for foods and beverages comprising the co-extruded laminate according to claim 2.

4. The co-extruded laminate according to claim 1, wherein the aromatic ring substituent joined to polymer B is positioned meta to the aromatic ring substituent joined to polymer A.

5. The co-extruded laminate according to claim 1, wherein block A of the block copolymers is produced by the metallocene catalyzed polymerization of ethylene optionally together with other alkene-1 compounds.

6. The co-extruded laminate according to claim 1, wherein block A has a number average molecular weight (Mn) in the range 1000 to 10,000.

7. The co-extruded laminate according to claim 1, wherein block B is produced by the free radical catalyst polymerization of vinyl acetate.

8. The co-extruded laminate according to claim 1, wherein block B has a molecular weight (Mn) in the range of 3000 to 6000.

9. A co-extruded laminate comprising a layer of polyethylene or a layer of paper bonded to a layer of polyethylene terephthalate, wherein the layer of polyethylene or the layer of polyethylene terephthalate contains a block copolymer of the following structure:

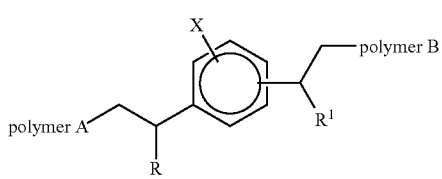

wherein R and $R^1$ are the same or different and each independently represents an alkyl or aryl group, and X is hydrogen or a $C_1$ to $C_{20}$ alkyl group which is branched or linear; wherein the aromatic ring substituent joined to polymer B is positioned meta or para to the aromatic ring substituent joined to polymer A; and wherein polymer A is a polymer (or copolymer) of ethylene and polymer B is a polymer of monomers selected from vinyl acetate, $C_1$-$C_9$ acrylate esters, acrylic acid, and mixtures thereof.

10. The co-extruded laminate according to claim 9, wherein the inherent viscosity (IV) of the polyethylene terephthalate used in the co-extruded, laminate is in the range of 0.72 to 0.88 dL/g.

11. The co-extruded laminate according to claim 9, wherein the polyethylene is medium-density polyethylene, low-density polyethylene, or linear low-density polyethylene.

12. The co-extruded laminate according to claim 9, wherein the co-extruded laminate comprises a layer of polyethylene provided on both surfaces with a layer of polyethylene terephthalate.

13. A co-extruded laminate comprising the co-extruded, laminate of claim 9 laminated to paper or board.

14. The co-extruded laminate according to claim 12, wherein the inherent viscosity (IV) of the polyethylene terephthalate used in the co-extruded laminate is in the range of 0.72 to 0.88 dL/g.

15. The co-extruded laminate according to claim 12, wherein the polyethylene is medium-density polyethylene, low-density polyethylene, or linear low-density polyethylene.

16. A process for the production of the co-extruded laminate of polyethylene and polyethylene terephthalate according to claim 9, comprising: co-extruding layers of polyethylene and polyethylene terephthalate, wherein at least one of the layers contains a block copolymer of the structure:

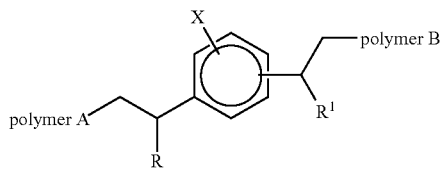

wherein R and $R^1$ are the same or different and each independently represents an alkyl or aryl group, and X is hydrogen or a $C_1$ to $C_{20}$ alkyl group which is branched or linear; wherein the aromatic ring substituent joined to polymer B is positioned meta or para to the aromatic ring substituent joined to polymer A; and wherein polymer A is a polymer (or copolymer) of ethylene and polymer B is a polymer of monomers selected from vinyl acetate, $C_1$-$C_9$ acrylate esters, acrylic acid, and mixtures thereof.

* * * * *